(12) United States Patent
Devarayanigari

(10) Patent No.: US 9,936,386 B2
(45) Date of Patent: Apr. 3, 2018

(54) METHOD OF CONTROLLING A TIMER IN USER EQUIPMENT

(71) Applicant: Samsung Electronics Co., Ltd., Gyeonggi-do (KR)

(72) Inventor: Pavan Kumar Devarayanigari, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/187,303

(22) Filed: Jun. 20, 2016

(65) Prior Publication Data

US 2016/0373928 A1 Dec. 22, 2016

(30) Foreign Application Priority Data

Jun. 18, 2015 (IN) ..................... 3063/CHE/2015 PS
Jan. 6, 2016 (IN) ..................... 3063/CHE/2015 CS

(51) Int. Cl.
| | |
|---|---|
| *H04M 1/66* | (2006.01) |
| *H04W 12/06* | (2009.01) |
| *H04L 29/08* | (2006.01) |
| *H04W 12/08* | (2009.01) |
| *H04W 12/10* | (2009.01) |
| *H04W 88/02* | (2009.01) |
| *H04W 8/18* | (2009.01) |
| *H04W 60/00* | (2009.01) |
| *H04W 88/06* | (2009.01) |

(52) U.S. Cl.
CPC ........... *H04W 12/06* (2013.01); *H04L 67/303* (2013.01); *H04W 12/08* (2013.01); *H04W 12/10* (2013.01); *H04W 8/183* (2013.01); *H04W 60/00* (2013.01); *H04W 88/02* (2013.01); *H04W 88/06* (2013.01)

(58) Field of Classification Search
CPC ..... H04W 12/06; H04W 8/183; H04W 14/10; H04W 28/14; H04W 36/0022; H04W 36/14; H04W 36/24; H04W 52/0203; H04W 52/0216; H04W 72/0413; H04W 72/042; H04W 74/00; H04W 76/045; H04W 80/00; H04W 84/045; H04W 12/08; H04W 88/08; H04W 12/10; H04W 60/00; H04W 88/02; H04W 60/06; H04W 76/02; H04W 88/04; H04W 88/06; H04W 48/18; H04W 8/18; H04W 48/02; H04W 88/16; H04W 76/027; H04W 36/0011; H04W 48/08; H04W 84/042; G01S 1/042; G01S 19/42; G01S 19/52
See application file for complete search history.

(56) References Cited

U.S. PATENT DOCUMENTS

| | | | |
|---|---|---|---|
| 8,825,009 B2 * | 9/2014 | Breuer .................. | H04L 63/108 455/410 |
| 9,380,630 B2 * | 6/2016 | Youtz .................. | H04W 76/027 |
| 2012/0171993 A1 | 7/2012 | Tiwari | |

(Continued)

*Primary Examiner* — Nimesh Patel
(74) *Attorney, Agent, or Firm* — The Farrell Law Firm, P.C.

(57) ABSTRACT

A method of controlling a timer in a User Equipment (UE) is provided. The method includes determining, by a controller in the UE, whether a current international mobile subscriber identity (IMSI) matches a stored IMSI if the UE is powered ON, activating, by the controller, the timer if the current IMSI matches the stored IMSI; and stopping the timer if the current IMSI does not match the stored IMSI.

11 Claims, 11 Drawing Sheets

(56) References Cited

U.S. PATENT DOCUMENTS

| | | | | |
|---|---|---|---|---|
| 2012/0178457 A1* | 7/2012 | Liao | ................... | H04W 76/027 |
| | | | | 455/437 |
| 2014/0024330 A1* | 1/2014 | Chu | ................ | H04M 1/72541 |
| | | | | 455/404.1 |
| 2016/0044490 A1* | 2/2016 | Yang | ................... | H04W 12/06 |
| | | | | 455/411 |
| 2017/0094501 A1* | 3/2017 | Huang-Fu | ........... | H04W 76/027 |

\* cited by examiner

METHOD OF CONTROLLING A TIMER IN USER EQUIPMENT

PRIORITY

This application claims priority under 35 U.S.C. § 119(a) to Indian Provisional Patent Application Serial No. 3063/CHE/2015 (PS), which was filed on Jun. 18, 2015 in the Indian Intellectual Property Office, and to Indian Complete Patent Application Serial No. 3063/CHE/2015 (CS), which was filed on Jan. 6, 2016 in the Indian Intellectual Property Office, the entire disclosure of each of these applications is incorporated herein by reference.

BACKGROUND

1. Field of the Disclosure

The present disclosure relates to a method of controlling a timer in user equipment (UE).

2. Description of the Related Art

Generally, when a UE adds a public land mobile network (PLMN) to a "Forbidden PLMN List" or a "Forbidden PLMNs for General packet radio service (GPRS) service" list or sets a subscriber identity module (SIM)/universal SIM (USIM) as invalid for Non-GPRS services or GPRS services (or both), and a timer "T3245" is not running, the UE initiates the timer "T3245" with a random value (i.e., in a range between 24 hrs and 48 hrs). Further, after the expiration of the timer "T3245", the UE removes the "Forbidden PLMN List" and the "Forbidden PLMNs for the GPRS service" list and sets the SIM or the USIM to valid for the non-GPRS services and the GPRS services. When the lists are removed, the UE performs a cell selection mechanism according to 3GPP TS 43.022 [82] and 3GPP TS 25.304 [98]. Further, if the UE is powered OFF/ON, the timer "T3245" has to be considered and based on a remaining timer period for the timer "T3245" to expire, one or more actions are to be taken.

In a situation where the UE is powered OFF while the timer "T3245" is running, when the UE is powered ON, the timer "T3245" will be restarted with a value equal to "$t_1-t$", where "$t_1$" is the remaining time period for the timer "T3245" to expire at a power OFF event of the UE and "t" is the time elapsed between the power OFF event and a power ON event. If "$t_1$" is greater than "t", then the timer "T3245" will be restarted with the value equal to "$t_1-t$". Alternatively, if "$t_1$" is less than or equal to "t", then the UE will follow the same behavior as the UE upon expiration of the timer "T3245". On the other hand, if the UE is not capable of determining "t", the UE restarts the timer "T3245" with the value "$t_1$".

If the UE is powered OFF and again powered ON with a different SIM (i.e., a different SIM from the SIM on which the timer "T3245" is initiated), the behavior of the UE may not be defined which may lead to incorrect behavior. As per the existing specification, the UE checks the remaining time period between the power OFF and power ON and removes the "Forbidden PLMN List". The "Forbidden PLMN List" has to be removed if the SIM that is inserted is the same as the SIM on which the "PLMN Not Allowed or GPRS Not Allowed" is received and the timer "T3245" is initiated.

As shown in FIG. 1A, where a SIM-1 is inserted in the UE, the UE sends an "ATTACH request message" to a network entity. Further, the UE receives an "ATTACH reject message" from the network entity with cause as "PLMN Not Allowed". After receiving the "ATTACH reject message," the UE adds the PLMN-1 to the "Forbidden PLMN List" and initiates the timer "T3245" with the value of 24 hrs; the UE is powered OFF while the timer is running. Further, the UE is powered ON after 24 hrs with a SIM-2 inserted in the UE. The SIM-2 includes a PLMN-2 and a PLMN-3 as the forbidden PLMNs. After detecting that the UE is powered ON, as the timer "T3245" duration is already completed, the UE removes the forbidden PLMNs (i.e., the PLMN-2 and PLMN-3), and the UE sends an "ATTACH request message" to the forbidden PLMN's (i.e., the PLMN-2 and PLMN-3) though the PLMNs should not be accessed. The UE unnecessarily attempts registration with the network entity, thus wasting radio resources.

As shown in FIG. 1B, where the SIM-1 and the SIM-2 are inserted in the SIM slots available in the UE (i.e., dual SIM dual standby device), the UE is powered ON with the SIM-1 and the SIM-2. Initially, the UE sends the "ATTACH request message" using the SIM-1 to the network entity. Further, the UE receives the "ATTACH reject message" from the network entity with cause as "PLMN Not Allowed". After receiving the "ATTACH reject message," the UE adds the PLMN-1 to the "Forbidden PLMN List" and initiates the timer "T3245" with the value of 24 hrs. Similarly, the UE sends the "ATTACH request message" using the SIM-2 to the network entity. Further, the UE receives the "ATTACH reject message" from the network entity with cause as "PLMN Not Allowed".

After receiving the "ATTACH reject message," the UE adds the PLMN-2 to the "Forbidden PLMN List" and initiates the timer "T3245" with the value of 24 hrs. After 23.55 minutes of the timer "T3245" using the SIM-1, the UE is powered OFF. The SIM-1 and the SIM-2 are swapped, where the timer "T3245" using the SIM-2 with PLMN-2 included in the "Forbidden PLMN List" is initiated and 10 minutes has elapsed. The remaining time period for the timer "T3245" using the SIM-2 is set to expire at 23:50 minutes. Further, the UE is powered ON, and after 5 minutes, the PLMN-2 included in the "Forbidden PLMN List" is removed and the PLMN search is performed rather than removing the PLMN-2 after 23:50 minutes. Similarly, the PLMN-1 included in the "Forbidden PLMN List" is removed after 23:50 minutes instead of removing it after 5 minutes. Due to the following reasons outlined above, there is a delay in camping and registration of the UE with the network entity, the UE may be in out of service (OOS) for longer duration, the UE may miss any mobile terminal (MT) calls or paging messages, the UE may be unable to perform any calls or services, or the like.

SUMMARY

An aspect of the present disclosure is to provide a mechanism for controlling a timer in a UE after receiving a "ATTACH reject message" from a network entity.

Another aspect of the present disclosure is to provide a mechanism for detecting whether a current international mobile subscriber identity (IMSI) matches a stored IMSI when the UE is powered ON.

Yet another aspect of the present disclosure is to provide a mechanism for activating a timer when a match between the current IMSI and the stored IMSI is detected.

Still another aspect of the present disclosure is to provide a mechanism, using a controller unit, for stopping the timer when a mismatch between the current IMSI and the stored IMSI is detected.

Still yet another aspect of the present disclosure is to provide a mechanism for detecting, using the controller unit, a remaining time period of the timer stored in an elementary file (EF) when the UE is powered ON.

Yet another aspect of the present disclosure is to provide a mechanism for activating, using the controller unit, the timer for the remaining time period.

In accordance with an aspect of the present disclosure, there is provided a method of controlling a timer in a UE. The method includes determining, by a controller in the UE, whether a current international mobile subscriber identity (IMSI) matches a stored IMSI if the UE is powered ON, activating, by the controller, the timer if the current IMSI matches the stored IMSI and stopping the timer if the current IMSI does not match the stored IMSI.

In accordance with an aspect of the present disclosure, there is provided a method of controlling a timer in a UE. The method includes determining, by a controller in the UE, a remaining time period of the timer stored in an elementary file (EF) if the UE is powered ON, and activating, by the controller, the timer for the remaining time period.

In accordance with an aspect of the present disclosure, there is provided an apparatus in a UE for controlling a timer. The UE includes a controller that is configured to determine whether a current international mobile subscriber identity (IMSI) matches a stored IMSI if the UE is powered ON activate the timer if the current IMSI matches the stored IMSI, and stop the timer if the current IMSI does not match the stored IMSI.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1A:
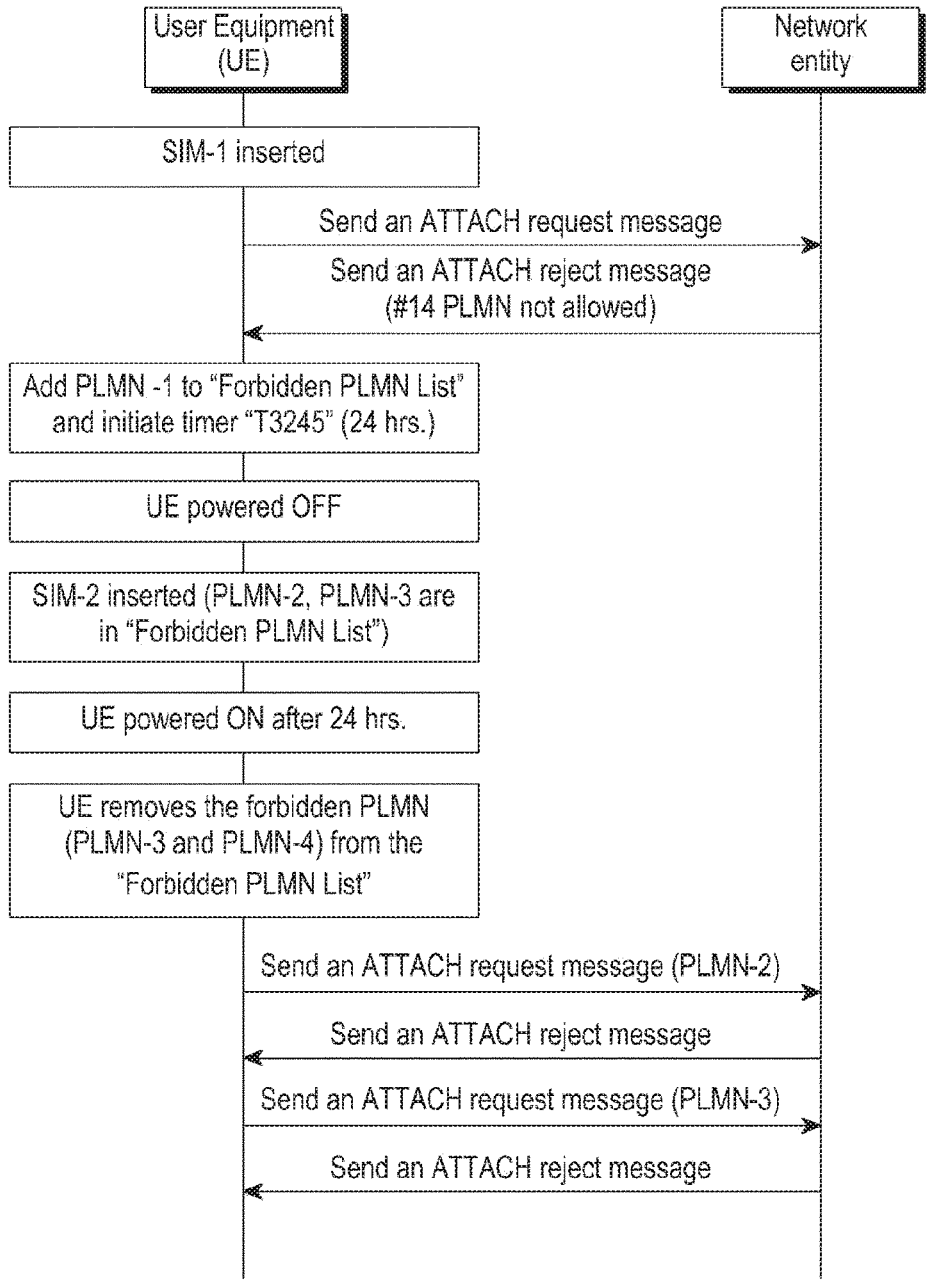
FIGS. 1A and 1B are sequence diagrams illustrating a conventional mechanism according to the related art.
Figure 1B:
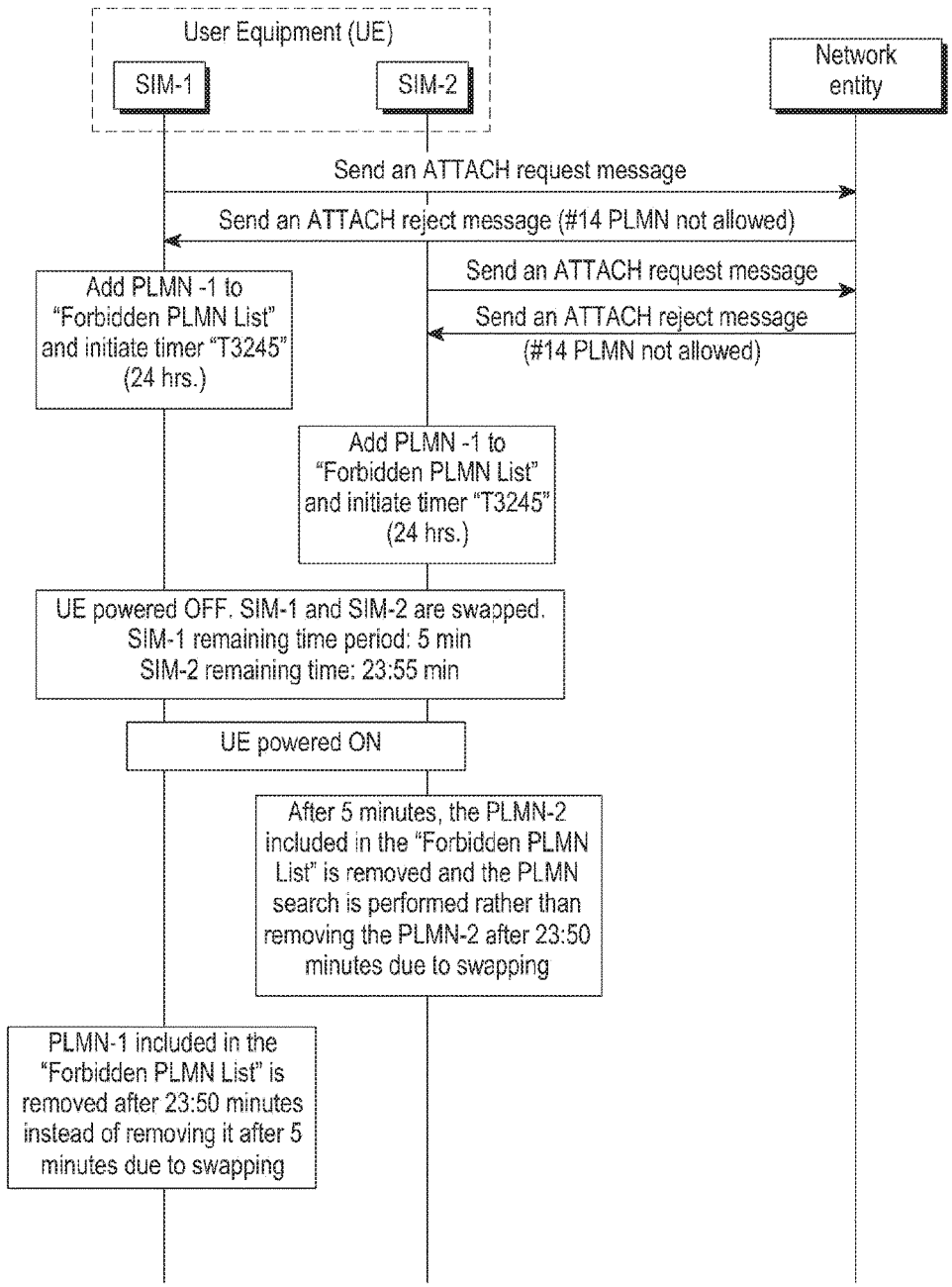

The embodiments described herein and the various features and advantageous details thereof are explained more fully with reference to the non-limiting embodiments that are illustrated in the accompanying drawings and detailed in the following description. Descriptions of well-known components and processing techniques have been omitted so as not to unnecessarily obscure the embodiments herein described. Also, the embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments described herein can be practiced and to further enable those skilled in the art to practice the embodiments herein described. Accordingly, the examples should not be construed as limiting the scope of the embodiments herein.

The technology described herein is a part of the 3GPP NAS 24.008, 24.301_CR2148 Rel-12 specification.

The following requirements apply for a UE that is configured to use a timer T3245 (see 3GPP TS 24.368 [15A] or 3GPP TS 31.102 [17]):

When the UE adds a PLMN identity to the "forbidden PLMN list", the "forbidden PLMNs for attach in S101 mode" list, or the "forbidden PLMNs for GPRS service" list or sets the USIM as invalid for non-EPS services or EPS services or both, and timer T3245 (see 3GPP TS 24.008 [13]) is not running, the UE starts the timer T3245 as specified in 3GPP TS 24.008 [13], sub clause 4.1.1.6.

Upon expiration of the timer T3245, the UE shall erase the "forbidden PLMN list", the "forbidden PLMNs for GPRS service" list, and the "forbidden PLMNs for attach in S101 mode" list and set the USIM to valid for non-EPS and EPS services. When the lists are erased, the UE performs cell selection according to 3GPP TS 36.304 [21].

If the UE is switched off when the timer T3245 is running, the UE behaves as follows when the UE is switched on and the USIM in the MS (Mobile Station) remains the same:

When the time remaining for T3245 timeout at switch off is t1 and t is the time elapsed between switch off and switch on, if t1 is greater than t, then the timer is restarted with the value t1–t. If t1 is less than or equal to t, the UE will follow the behavior as defined in the paragraph above upon expiration of the timer T3245. If the UE is not capable of determining t, the UE restarts the timer with the value t1.

Unlike conventional methods and systems, the methods described herein provide a mechanism to reconfigure the timer "T3245" value based on the SIM change status when the UE is powered OFF. If the SIM is the same, the timer "T3245" value is configured with the remaining time period for the timer "T3245" to expire and elapsed time between the power OFF/ON event. Further, if the SIM is different, the timer "T3245" is stopped.

Unlike conventional systems and methods, the methods described herein provides a mechanism for controlling a SIM validation timer in the UE. When the UE is powered ON and if the timer "T3245" is running, a change of the SIM is detected before and after power OFF/ON. If the SIM is different, the timer "T3245" is stopped. The present mechanism provides faster recovery to normal services in the UE and avoids accessing the forbidden PLMNs after the UE is powered ON. Further, the mechanism avoids unnecessary registration attempts on the forbidden PLMNs and provides (circuit switched (CS) or packet switched (PS)) services to the user as soon as the UE is powered ON, without blocking the area update attempts.

Figure 2:
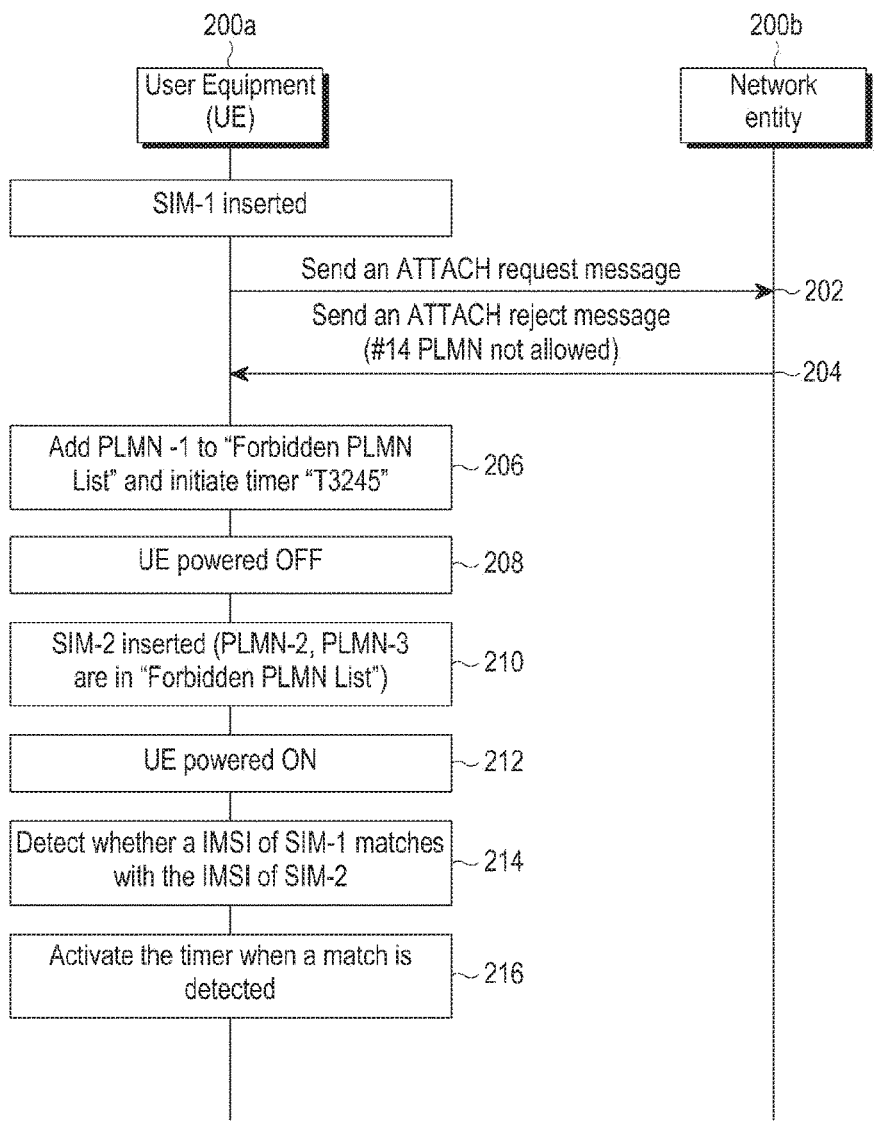
FIG. 2 is a sequence diagram illustrating a method for activating a timer "T3245" in a UE when a match between a current IMSI and a stored IMSI is detected, according to an embodiment of the present disclosure.

FIG. 2 is a sequence diagram illustrating a method for activating a timer "T3245" in a UE when a match between a current IMSI and a stored IMSI is detected, according to an embodiment of the present disclosure. The sequence diagram illustrates a sequence of operations/steps between a UE 200a and a network entity 200b. The UE 200a can be a laptop, a desktop computer, a mobile phone, a mobile station, a mobile terminal, a smart phone, personal digital assistants (PDAs), a tablet, a phablet, or any other electronic device. Initially, a SIM-1 can be inserted in a SIM slot available in the UE 200a. The SIM-1 includes an IMSI which is stored in the UE 200a.

In long term evolution (LTE), the network entity 200b can be a mobility management entity (MME). The MME is responsible for the delivery of data packets to the UE 200a back and forth within its geographical service area, including packet routing and transfer, mobility management (attach or detach and tracking area management), session management (packet data network (PDN) connection establishment or disconnection), logical link management, and authentication and charging functions. Further, the MME can also serve as a local mobility anchor for inter-working with other RATs (remote access technologies) (e.g. global system for mobile communication (GSM) and universal mobile telecommunications system (UMTS)). In UMTS, the network entity 200b can be a serving GPRS support node (SGSN). The SGSN is responsible for the delivery of data packets to the UE 200a back and forth within its geographical service area, including packet routing and transfer, mobility management (attach/detach and tracking area management), session management Packet Data Protocol (PDP) context establishment/disconnect), logical link management, and authentication and charging functions.

In GSM, the network entity 200b can be a mobile switching center (MSC). The MSC is responsible for the delivery of voice service in circuit switch manner to the mobile devices back and forth within its geographical service area, including mobility management (attach/detach and location area management), logical link management, and authentication and charging functions.

At step 202, the UE 200a sends a request message to the network entity 200b. The request message is an "ATTACH request message" (ATTACH_REQUEST).

At step 204, after receiving the request message, the network entity 200b sends a reject message to the UE 200a. The reject message is an "ATTACH reject message" (ATTACH_REJECT). The reject message indicates to the UE 200a that a PLMN is not allowed (i.e., Cause#14 PLMN-1 not allowed).

At step 206, the UE 200a, after receiving the reject message, adds the PLMN-1 to a "Forbidden PLMN list". Further, the UE 200a initiates a timer "T3245" after adding the PLMN-1 to the "Forbidden PLMN List".

At step 208, while the timer "T3245" is running, the UE 200a is powered OFF.

At step 210, after the UE 200a is powered OFF, a SIM-2 is inserted in the SIM slot available in the UE 200a by removing the SIM-1. The SIM-2 includes an IMSI. For the SIM-2, the PLMN-2 and PLMN-3 are in the "Forbidden PLMN List".

At step 212, the UE 200a is powered ON with the SIM-2.

At step 214, after the UE 200a is powered ON with the SIM-2, the UE 200a detects whether a current IMSI (i.e., IMSI of the SIM-2) matches with a stored IMSI (i.e., IMSI of the SIM-1).

At step 216, after detecting that the current IMSI is matched with the stored IMSI, the UE 200a activates (or restarts) the timer "T3245".

The UE 200a detects whether a remaining time period for the timer "T3245" to expire at a power OFF event is greater than an elapsed time period between the power OFF event and a power ON event of the UE 200a. Further, the UE 200a computes a difference between the remaining time period for the timer "T3245" to expire at the power OFF event, and the elapsed time period between the power OFF event and the power ON event. Further, the UE 200a activates the timer "T3245" by restarting the timer "T3245" based on the computed difference.

The UE 200a activates by restarting the timer "T3245" in accordance to the remaining time period for the timer "T3245" to expire at the power OFF event. If the remaining time period for the timer "T3245" to expire at the power OFF event is equal to or less than elapsed time period between the power OFF event and a power ON event of the UE 200a, the UE 200a will erase the "Forbidden PLMN List", the "forbidden PLMNs for GPRS service" list, and the "forbidden PLMNs for attach in S101 mode" list and set the SIM to valid for non-EPS and EPS services. When the lists are erased, the UE 200a performs cell selection according to 3GPP TS 36.304 [21].

Figure 3:
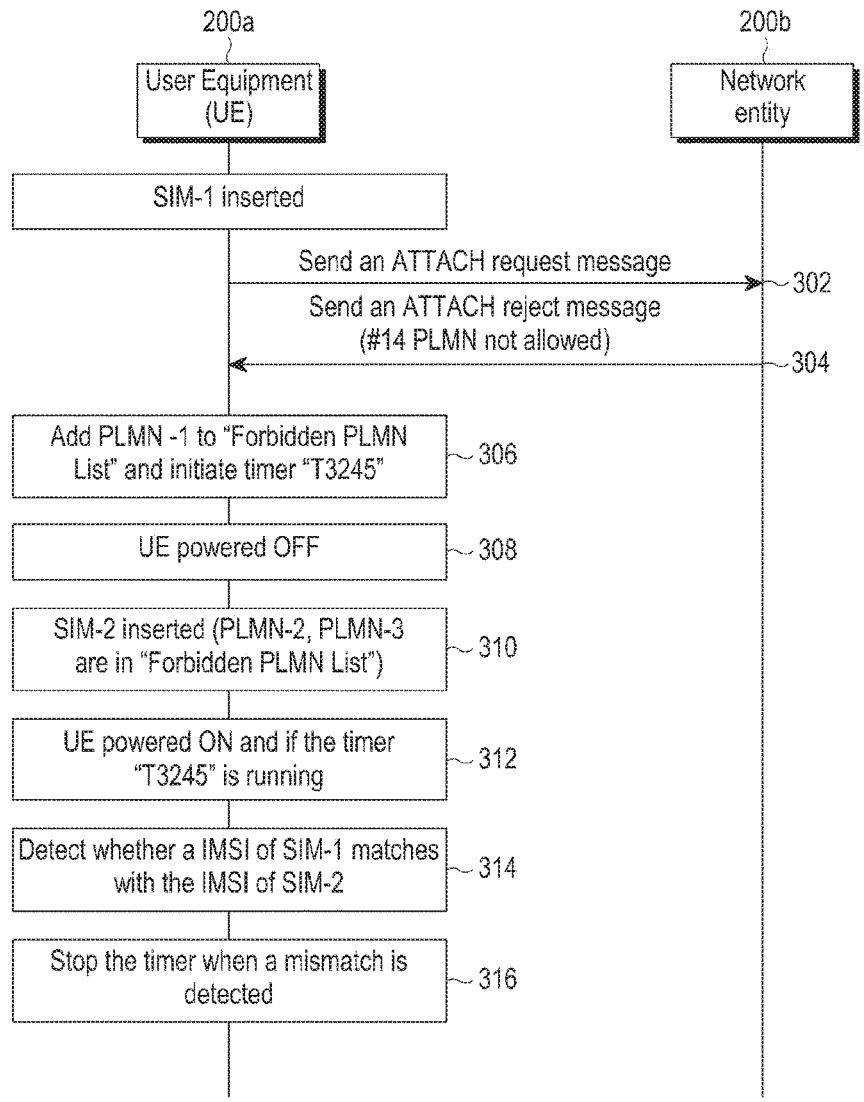
FIG. 3 is a sequence diagram illustrating a method for stopping a timer "T3245" in a UE when a mismatch between a current IMSI and a stored IMSI is detected, according to an embodiment of the present disclosure.

FIG. 3 is a sequence diagram illustrating a method for stopping the timer "T3245" in the UE 200a when a mismatch between the current IMSI and the stored IMSI is detected, according to an embodiment of the present disclosure. The sequence diagram illustrates a sequence of operations between the UE 200a and the network entity 200b. Initially, the SIM-1 is inserted in the SIM slot available in the UE 200a. The SIM-1 includes the IMSI which is stored in the UE 200a.

At step 302, the UE 200a sends the request message to the network entity 200b. The request message is the "ATTACH request message" (ATTACH_REQUEST).

At step 304, after receiving the request message, the network entity 200b sends the reject message to the UE 200a. The reject message is the "ATTACH reject message" (ATTACH_REJECT). The reject message indicates to the UE 200a that the PLMN is not allowed (i.e., Cause#14 PLMN-1 not allowed).

At step 306, the UE 200a, after receiving the reject message, adds the PLMN-1 to the "Forbidden PLMN list". Further, the UE 200a initiates the timer "T3245" after adding the PLMN-1 to the "Forbidden PLMN list".

At step 308, while the timer "T3245" is running, the UE 200a is powered OFF. At step 310, after the UE 200a is powered OFF, the SIM-2 is inserted in the SIM slot available in the UE 200a by removing the SIM-1. The SIM-2 includes the IMSI. For the SIM-2, the PLMN-2 and PLMN-3 are in the "Forbidden PLMN List".

At step 312, the UE 200a is powered ON with the SIM-2.

At step 314, after the UE 200a is powered ON with the SIM-2 and if the timer "T3245" is running, the UE 200a detects whether the current IMSI (i.e., IMSI of the SIM-2) matches with the stored IMSI (i.e., IMSI of the SIM-1).

At step 316, after detecting that the current IMSI is mismatched with the stored IMSI, the UE 200a stops the timer "T3245".

Figure 4:
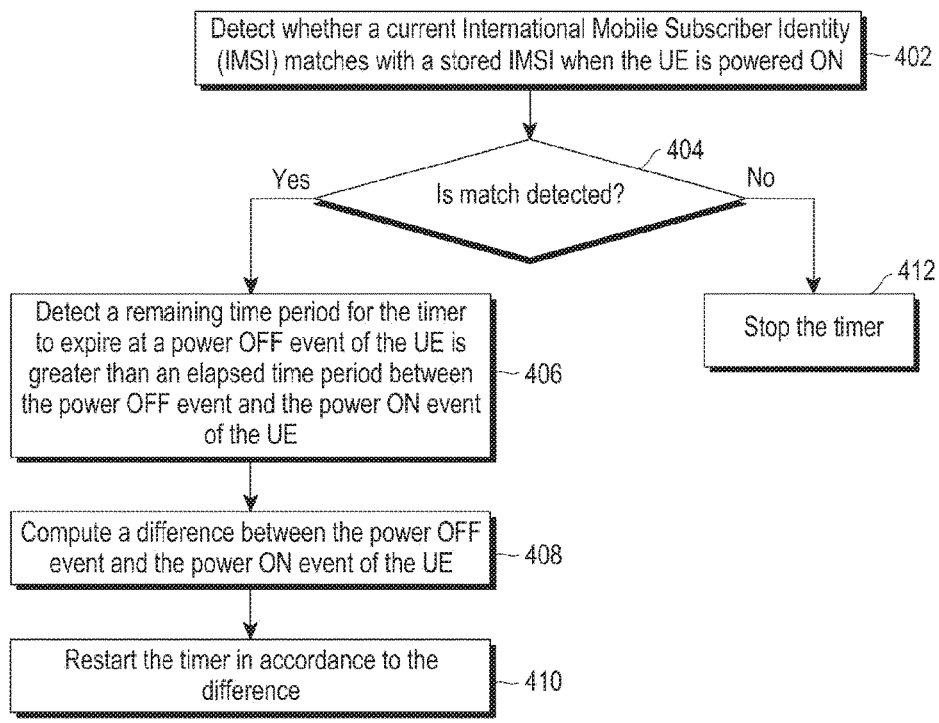
FIG. 4 is a flowchart of a method of controlling a timer in a UE, according to an embodiment of the present disclosure.

FIG. 4 is a flowchart of a method of controlling the timer "T3245" in the UE 200a, according to an embodiment of the present disclosure. At step 402, UE 200a detects whether the current IMSI matches with the stored IMSI when the UE 200a is powered ON.

If it is determined, at step 404, that the match between the current IMSI and the stored IMSI is detected, at step 406, UE 200a detects whether the remaining time period for the timer "T3245" to expire at the power OFF event of the UE 200a is greater than the elapsed time period between the power OFF event and the power ON event of the UE 200a.

At step 408, the UE 200a computes the difference between the remaining time period for the timer "T3245" to expire at the power OFF event and the elapsed time period between the power OFF event and the power ON event of the UE 200a.

At step 410, the UE 200a activates (or restarts) the timer in accordance to the difference. If it is determine, at step 404, that the mismatch between the current IMSI and the stored IMSI is detected, at step 412, the method includes stopping the timer "T3245" if the timer "T3245" is initiated after the UE 200a is powered ON.

The various actions, acts, blocks, steps, or the like in the method of FIG. 4 may be performed in the order presented, in a different order or simultaneously. Further, some of the actions, acts, blocks, steps, or the like may be omitted, added, modified, skipped, or the like without departing from the scope of the invention.

Figure 5:
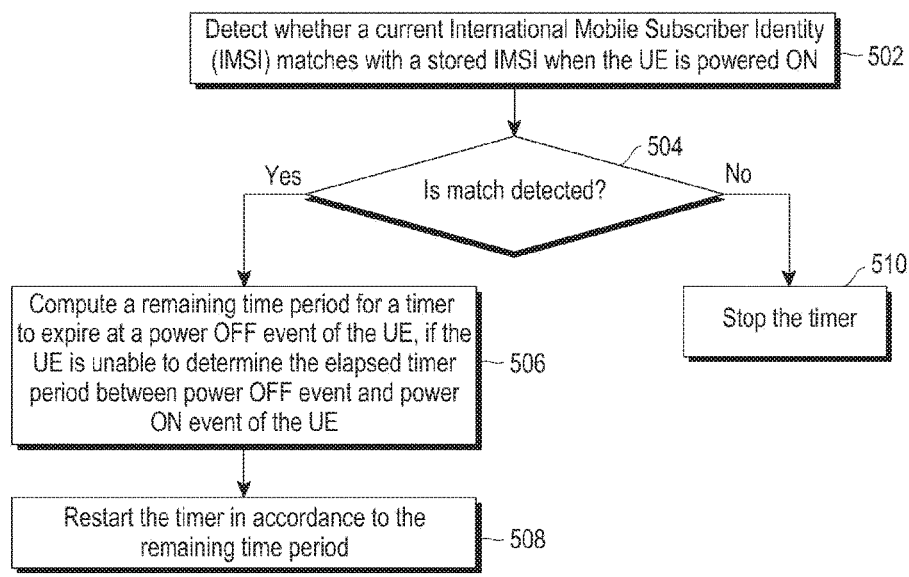
FIG. 5 is a flowchart of a method of controlling a timer in a UE, according to an embodiment of the present disclosure.

FIG. 5 is a flowchart of a method of controlling the timer "T3245" in the UE 200a, according to an embodiment of the present disclosure. At step 502, the UE 200a detects whether the current IMSI matches with the stored IMSI when the UE 200a is powered ON.

If it is determined, at step 504, that the match between the current IMSI and the stored IMSI is detected, at step 506, the UE 200a detects the remaining time period for the timer "T3245" to expire at the power OFF event of the UE 200a if the UE 200a is unable to determine the elapsed time period between the power OFF event and the power ON event of the UE 200a.

At step 508, the UE 200a activates (or restarts) the timer "T3245" in accordance to the remaining time period. If it is determined, at step 504, that the mismatch between the current IMSI and the stored IMSI is detected, at step 510, the method includes stopping the timer "T3245" if the timer "T3245" is initiated after the UE 200a is powered ON.

The various actions, acts, blocks, steps, or the like in the method of FIG. 5 may be performed in the order presented, in a different order or simultaneously. Further, some of the actions, acts, blocks, steps, or the like may be omitted, added, modified, skipped, or the like without departing from the scope of the invention.

Figure 6:
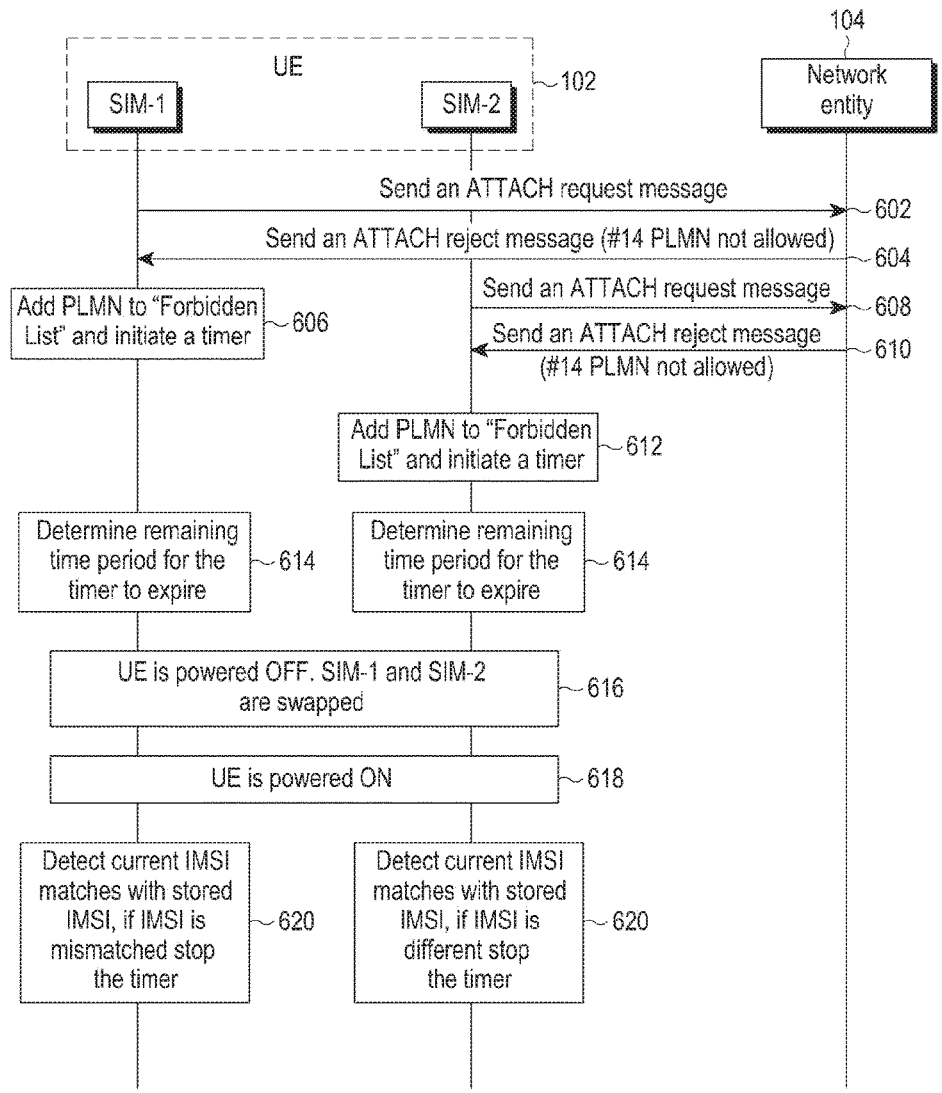
FIG. 6 is a sequence diagram illustrating a method for stopping a timer "T3245" when a mismatch between a current IMSI and a stored IMSI is detected, according to an embodiment of the present disclosure.

FIG. 6 is a sequence diagram illustrating a method for stopping the timer "T3245" when the mismatch between the current IMSI and the stored IMSI is detected, according to an embodiment of the present disclosure. The sequence diagram illustrates a sequence of operations between the UE 200a and the network entity 200b. Initially, the SIM-1 is inserted in the SIM slot-1 and the SIM-2 is inserted in the SIM slot-2 available in the UE 200a (i.e., the UE 200a with dual SIM capability).

At step 602, the UE 200a sends the request message to the network entity 200b using the SIM-1. The request message is the "ATTACH request message" (ATTACH_REQUEST).

At step 604, after receiving the request message, the network entity 200b sends the reject message to the UE 200a. The reject message is the "ATTACH reject message" (ATTACH_REJECT). The reject message indicates to the UE 200a that the PLMN is not allowed (i.e., Cause#14 PLMN-1 not allowed).

At step 606, the UE 200a, after receiving the reject message, adds the PLMN-1 of the SIM-1 to the "Forbidden PLMN list". Further, the UE 200a initiates the timer "T3245" for the SIM-1 after adding the PLMN-1 to the "Forbidden PLMN list".

At step 608, the UE 200a sends the request message to the network entity 200b using the SIM-2.

At step 610, after receiving the request message, the network entity 200b sends the reject message to the UE 200a. The reject message indicates to the UE 200a that the PLMNs (i.e., PLMN-2 and PLMN-3) of the SIM-2 are not allowed (i.e., Cause#14 PLMN-2 and PLMN-3 are not allowed).

At step 612, the UE 200a, after receiving the reject message, adds the PLMN-2 and the PLMN-3 of the SIM-2 to the "Forbidden PLMN list". Further, the UE 200a initiates the timer "T3245" after adding the PLMN-2 and the PLMN-3 to the "Forbidden PLMN list".

At step 614, the UE 200a determines the remaining time period for the timer "T3245" of the SIM-1 to expire before the UE 200a is powered OFF. Similarly, the UE 200a determines the remaining time period for the timer "T3245" of the SIM-2 to expire before the UE 200a is powered OFF.

At step 616, the UE 200a is powered OFF. After detecting that the UE 200a is powered OFF, the SIM-1 and the SIM-2 are swapped. In an example, the SIM-1 is removed from the SIM slot-1 and inserted in the SIM slot-2. Similarly, the SIM-2 is removed from the SIM slot-2 and inserted in the SIM slot-1.

At step 618, the UE 200a is powered ON.

At step 620, the UE 200a detects whether the IMSI of the SIM-2, which is currently inserted in the SIM slot-1, is mismatched with the IMSI of the SIM-1 which is earlier inserted in the SIM slot-1 before the UE 200a is powered OFF. The UE 200a stops the timer "T3245" due to mismatch. Similarly, the UE 200a detects that the IMSI of the SIM-1 which is currently inserted in the SIM slot-2 is mismatched with the IMSI of the SIM-2 which is earlier inserted in the SIM slot-2 before the UE 200a was powered OFF. The UE 200a stops the timer "T3245" due to mismatch.

In a case in which the UE 200a includes a dual SIM, the UE 200a maintains an IMSI-timer "T3245" remaining time period mapping table. If the SIMs are exchanged between different slots in same UE 200a, the value of the timer "T3245" is configured with the remaining time period of that particular SIM and time elapsed between powers OFF/ON is extracted from the mapping table.

Figure 7:
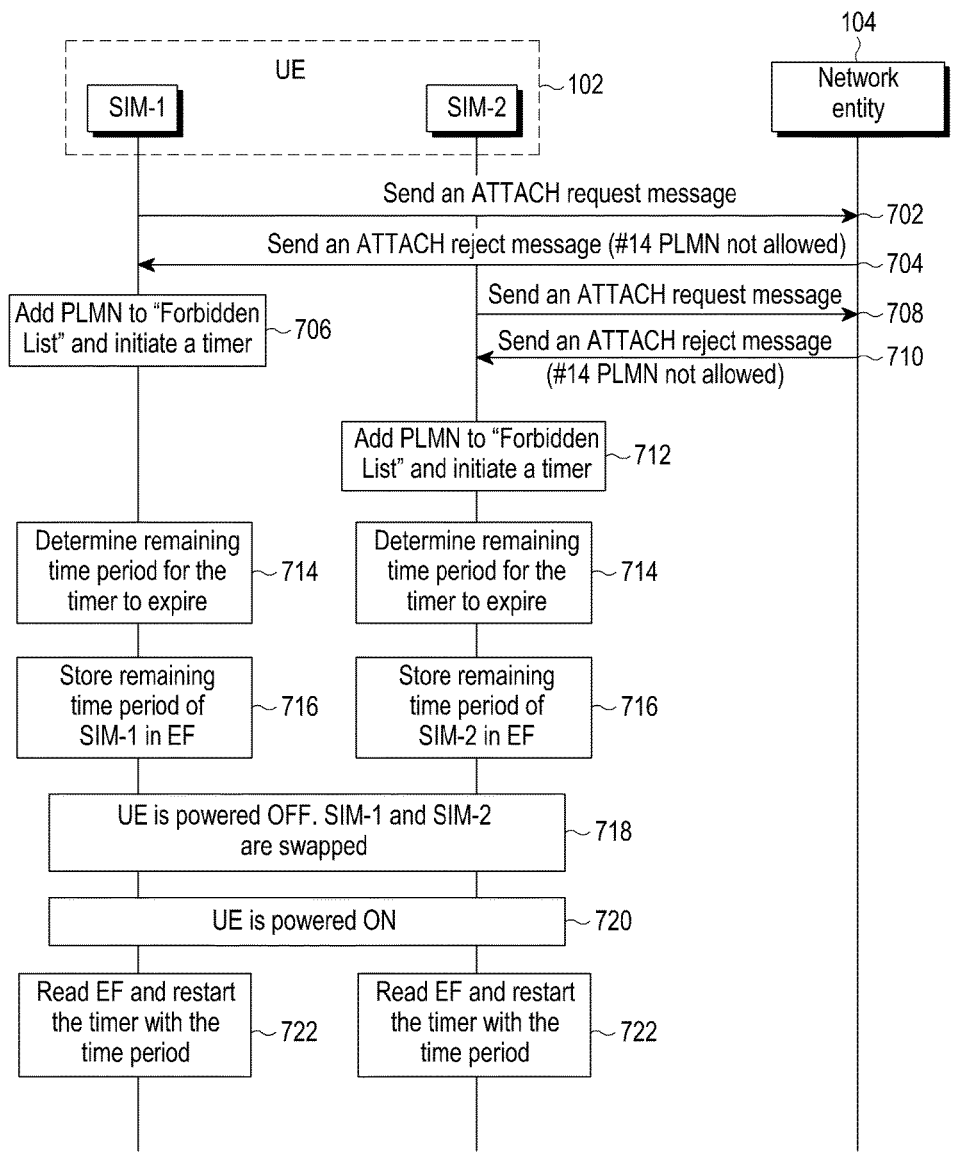
FIG. 7 is a sequence diagram illustrating a method for activating a timer "T3245" for a remaining time period, where the remaining time period is detected from an EF when the UE is powered ON, according to an embodiment of the present disclosure.

FIG. 7 is a sequence diagram illustrating a method for activating the timer "T3245" for the remaining time period, where the remaining time period is detected from the EF when the UE 200a is powered ON, according to an embodiment of the present disclosure. The sequence diagram illustrates a sequence of operations between the UE 200a and the network entity 200b. Initially, the SIM-1 is inserted in the SIM slot-1 and the SIM-2 is inserted in the SIM slot-2 available in the UE 200a (i.e., the UE 200a with dual SIM capability).

At step 702, the UE 200a sends the request message to the network entity 200b using the SIM-1. The request message is the "ATTACH request message" (ATTACH_REQUEST).

At step 704, after receiving the request message, the network entity 200b sends the reject message to the UE 200a. The reject message is the "ATTACH reject message" (ATTACH_REJECT). The reject message indicates the UE 200a that the PLMN is not allowed (i.e., Cause#14 PLMN-1 not allowed).

At step 706, the UE 200a, after receiving the reject message, adds the PLMN-1 of the SIM-1 to the "Forbidden PLMN list". Further, the UE 200a initiates the timer "T3245" for the SIM-1 after adding the PLMN-1 to the "Forbidden PLMN list".

At step 708, the UE 200a sends the request message to the network entity 200b using the SIM-2.

At step 710, after receiving the request message, the network entity 200b sends the reject message to the UE 200a. The reject message indicates to the UE 200a that the PLMNs (i.e., PLMN-2 and PLMN-3) of the SIM-2 are not allowed (i.e., Cause#14 PLMN-2 and PLMN-3 are not allowed).

At step 712, the UE 200a, after receiving the reject message, adds the PLMN-2 and the PLMN-3 of the SIM-2 to the "Forbidden PLMN list". Further, the UE 200a initiates the timer "T3245" after adding the PLMN-2 and the PLMN-3 to the "Forbidden PLMN list".

At step 714, the UE 200a determines the remaining time period for the timer "T3245" of the SIM-1 to expire before the UE 200a is powered OFF. Similarly, the UE 200a determines the remaining time period for the timer "T3245" of the SIM-2 to expire before the UE 200a is powered OFF.

At step 716, the UE 200a stores the remaining time period for the timer "T3245" of the SIM-1 to expire in the EF of the SIM-1. Similarly, the UE 200a stores the remaining time period for the timer "T3245" of the SIM-2 to expire in the EF of the SIM-2.

At step 718, the UE 200a is powered OFF. After detecting the UE 200a is powered OFF, the SIM-1 and the SIM-2 are swapped. The SIM-1 is removed from the SIM slot-1 and inserted in the SIM slot-2. Similarly, the SIM-2 is removed from the SIM slot-2 and inserted in the SIM slot-1.

At step 720, the UE 200a is powered ON.

At step 722, the UE 200a reads the remaining time period from the EF of the SIM-1 inserted in the SIM slot-2 and restarts the timer "T3245". Similarly, the UE 200a reads the remaining time period from the EF of the SIM-2 inserted in the SIM slot-1 and restarts the timer "T3245".

Figure 8:
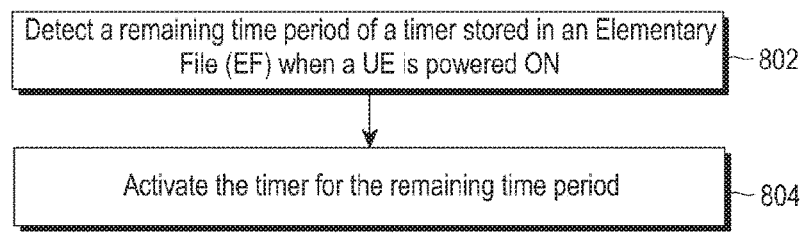
FIG. 8 is a flowchart of a method for activating a timer "T3245" for a remaining time period, where the remaining time period is detected from a EF when the UE is powered ON, according to an embodiment of the present disclosure.

FIG. 8 is a flowchart of a method for activating the timer "T3245" for the remaining time period, where the remaining time period is detected from the EF when the UE 200a is powered ON, according to an embodiment of the present disclosure. At step 802, the UE 200a detects the remaining time period of the timer "T3245" stored in the EF when the UE is powered ON.

At step 804, the UE 200a activates the timer "T3245" for the remaining time period.

The various actions, acts, blocks, steps, or the like in the method of FIG. 8 may be performed in the order presented, in a different order or simultaneously. Further, in some embodiments, some of the actions, acts, blocks, steps, or the like may be omitted, added, modified, skipped, or the like without departing from the scope of the invention.

Figure 9:
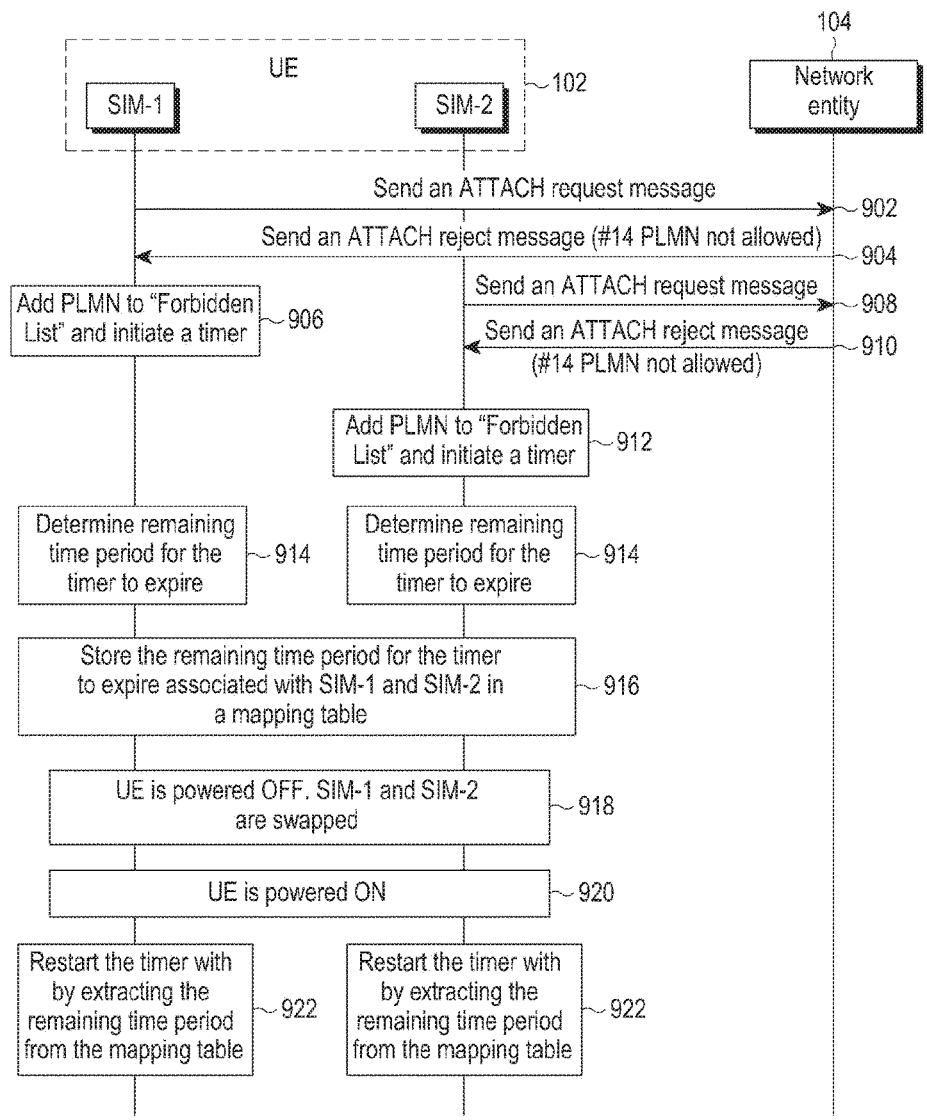
FIG. 9 is a sequence diagram illustrating a method for activating a timer "T3245" for a remaining time period, where the remaining time period is extracted from a mapping table, according to an embodiment of the present disclosure.

FIG. 9 is a sequence diagram illustrating a method for activating the timer "T3245" for the remaining time period, where the remaining time period is extracted from the mapping table, according to an embodiment of the present disclosure. The sequence diagram illustrates a sequence of operations between the UE 200a and the network entity 200b. Initially, the SIM-1 is inserted in the SIM slot-1 and the SIM-2 is inserted in the SIM slot-2 available in the UE 200a (i.e., the UE 200a with dual SIM capability).

At step 902, the UE 200a sends the request message to the network entity 200b using the SIM-1. The request message is the "ATTACH request message" (ATTACH_REQUEST).

At step 904, after receiving the request message, the network entity 200b sends the reject message to the UE 200a. The reject message is the "ATTACH reject message" (ATTACH_REJECT). The reject message indicates the UE 200a that the PLMN is not allowed (i.e., Cause#14 PLMN-1 not allowed).

At step 906, the UE 200a, after receiving the reject message, adds the PLMN-1 of the SIM-1 to the "Forbidden PLMN list". Further, the UE 200a initiates the timer "T3245" for the SIM-1 after adding the PLMN-1 to the "Forbidden PLMN list".

At step 908, the UE 200a sends the request message to the network entity 200b using the SIM-2.

At step 910, after receiving the request message, the network entity 200b sends the reject message to the UE 200a. The reject message indicates to the UE 200a that the PLMNs (i.e., PLMN-2 and PLMN-3) of the SIM-2 are not allowed (i.e., Cause#14 PLMN-2 and PLMN-3 are not allowed).

At step 912, the UE 200a, after receiving the reject message, adds the PLMN-2 and the PLMN-3 of the SIM-2 to the "Forbidden PLMN list". Further, the UE 200a initiates the timer "T3245" after adding the PLMN-2 and the PLMN-3 to the "Forbidden PLMN list".

At step 914, the UE 200a determines the remaining time period for the timer "T3245" of the SIM-1 to expire before the UE 200a is powered OFF. Similarly, the UE 200a determines the remaining time period for the timer "T3245" of the SIM-2 to expire before the UE 200a is powered OFF.

At step 916, the UE 200a stores the remaining time period for the timer "T3245" of the SIM-1 to expire and the remaining time period for the timer "T3245" of the SIM-2 to expire in a mapping table. In an example, consider a scenario where the remaining time period for the timer "T3245" to expire of the SIM-1 can be 5 minutes. Further, the remaining time period for the timer "T3245" to expire of the SIM-1 can be 23:55 minutes. The mapping table in the UE 200a is shown below as Table-1:

TABLE 1

| S. No | Remaining time period for the timer "T3245" to expire |
|---|---|
| SIM-1 | 5 minutes |
| SIM-2 | 23:55 minutes |

At step 918, the UE 200a is powered OFF. After detecting that the UE 200a is powered OFF, the SIM-1 and the SIM-2 are swapped. The SIM-1 is removed from the SIM slot-1 and inserted in the SIM slot-2. Similarly, the SIM-2 is removed from the SIM slot-2 and inserted in the SIM slot-1.

At step 920, the UE 200a is powered ON.

At step 922, the UE 200a reads the remaining time period from the mapping table for the SIM-1 inserted in the SIM slot-2 and restarts the timer "T3245". Similarly, the UE 200a reads the remaining time period from the mapping table for the SIM-2 inserted in the SIM slot-1 and restarts the timer "T3245".

Figure 10:
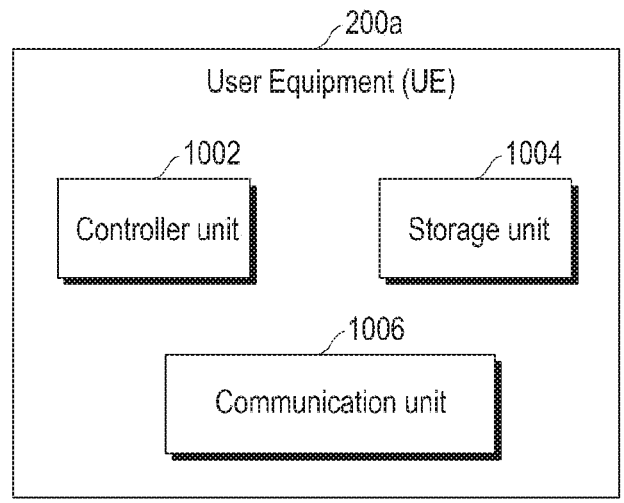
FIG. 10 is a diagram illustrating a UE for controlling a timer, according to an embodiment of the present disclosure.

FIG. 10 is a diagram illustrating the UE 200a, according to an embodiment of the present disclosure. The UE 200a includes a controller 1002, a storage unit 1004, and a communication unit 1006.

The controller unit 1002 detects whether the current IMSI matches with the stored IMSI when the UE 200a is powered ON. Further, the controller 1002 activates the timer, e.g., the timer "T3245," when the match is detected. The controller 1002 stops the timer when the mismatch is detected.

The controller 1002 detects whether the remaining time period for the timer to expire at the power OFF event of the UE 200a is greater than the elapsed time period between the power OFF event and the power ON event of the UE 200a. Further, the controller 1002 computes the difference between the remaining time period for the timer to expire at the power OFF event and the elapsed time period between the power OFF event and the power ON event. Further, the controller 1002 restarts the timer in accordance to the difference. The controller 1002 computes the remaining tie period for the timer to expire at the power OFF event of the UE 200a. Further, the controller 1002 restarts the timer in accordance to the remaining time period.

The controller unit 1002 detects the remaining time period of the timer stored in the EF when the UE 200a is powered ON. Further, the controller 1002 activates the timer for the remaining time period. The EF can be stored in the SIM/USIM/ISIM application of the UE 200a.

Further, the storage unit 1004 may include one or more computer-readable storage media. The storage unit 1004 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 1004 may, in some examples, be considered a non-transitory storage medium. The term "non-transitory" may indicate that the storage medium is not embodied in a carrier wave or a propagated signal. However, the term "non-transitory" should not be interpreted that the storage unit 1004 is non-movable. In some examples, the storage unit 1004 can be configured to store larger amounts of information than the memory. In certain examples, a non-transitory storage medium may store data that can, over time, change (e.g., in Random Access Memory (RAM) or cache). The communication unit 1006 can be configured for communicating internally between the units and externally with the networks.

The FIG. 10 shows various units of the UE 200a but it is to be understood that the UE 200a may include less or more number of units. Further, the labels or names of the units are used only for illustrative purpose and does not limit the scope of the invention. One or more units can be combined together to perform same or substantially similar function in the UE 200a.

Unlike the conventional methods and systems, the present method manages the SIM validation timer "T3245" thus, improving the performance of the UE 200a with optimized controlling of the timer "T3245". By the present method, issues like delay in camping and registration, OOS for longer duration, missing of MT call/paging, unable to perform CS calls, unable to perform PS services, more battery consumption, or the like can be addressed.

Figure 11:
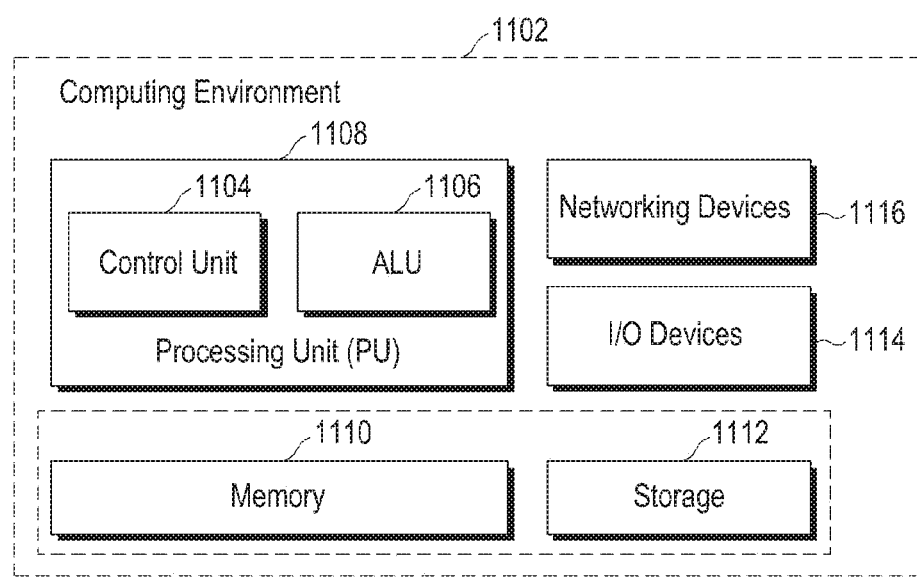
FIG. 11 is a diagram illustrating a computing environment implementing the method of controlling a timer in a UE, according to an embodiment of the present disclosure.

FIG. 11 is a diagram illustrating a computing environment implementing the method of controlling the timer in the UE 200a, according to an embodiment of the present disclosure. As depicted in FIG. 11, the computing environment 1102 includes at least one processing unit 1108 that is equipped with a control unit 1104 and an arithmetic logic unit (ALU) 1106, a memory 1110, a storage unit 1112, plurality of networking devices 1116 and a plurality Input output (I/O) devices 1114. The processing unit 1108 is responsible for processing the instructions of the schemes. The processing unit 1108 receives commands from the control unit in order to perform its processing. Further, any logical and arithmetic operations involved in the execution of the instructions are computed with the help of the ALU 1106.

The overall computing environment 1102 can be composed of multiple homogeneous or heterogeneous cores, multiple computer processing units (CPUs) of different kinds, special media and other accelerators. The processing unit 1108 is responsible for processing the instructions of the schemes. Further, the plurality of processing units 1108 may be located on a single chip (e.g., a system on chip (SoC)) or over multiple chips.

The scheme(s), which can include instructions and codes required for the implementation, are stored in either the memory unit 1110 or the storage 1112 or both. At the time of execution, the instructions may be fetched from the corresponding memory 1110 or storage 1112, and executed by the processing unit 1108.

In the case of any hardware implementations various networking devices 1116 or external I/O devices 1114 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 2 through 11 include blocks which can be at least one of a hardware device, or a combination of hardware device and software units.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of controlling a first timer of a first subscriber identity mode (SIM) and a second timer of a second SIM in a User Equipment (UE), the method comprising:
   initiating, by a controller in the UE, the first timer after adding a first public land mobile network (PLMN) related to the first SIM to a forbidden PLMN list;
   initiating, by the controller, the second timer after adding a second PLMN related to the second SIM to the forbidden PLMN list;
   determining, by the controller, whether a current international mobile subscriber identity (IMSI) included in the second SIM matches a stored IMSI included in the first SIM in response to the UE being powered ON after being powered OFF;
   if the current IMSI matches the stored IMSI, activating, by the controller, the first timer based on a first remaining time period of the first SIM and the second timer based on a second remaining time period of the second SIM;
   keeping the first PLMN in the forbidden PLMN list based on the first remaining time period, and keeping the second PLMN in the forbidden PLMN list based on the second remaining time period;
   removing the first PLMN from the forbidden PLMN list after the first remaining time period is expired, and removing the second PLMN from the forbidden PLMN list after the second remaining time period is expired; and stopping the first timer and the second timer if the current IMSI does not match the stored IMSI.

2. The method of claim 1, wherein activating the first timer and the second timer comprises:

determining, by the controller, whether the first remaining time period of the first SIM is greater than an elapsed time period between the powering off of the UE and the powering on of the UE and determining the second remaining time period of the second SIM is greater than the elapsed time period between the powering off of the UE and the powering on of the UE;

restarting, by the controller, the first timer based on a difference between the first remaining time period of the first SIM and the elapsed time period, when the first remaining time period is greater than the elapsed time period, and restarting the second timer based on a difference between the second remaining time period of the second SIM and the elapsed time period, when the second remaining time period is greater than the elapsed time period; and stopping the first timer, when the first remaining time period is less than or equal to the elapsed time period and stopping the second timer, when the second remaining time period is less than or equal to the elapsed time period.

3. The method of claim 1, wherein activating the first timer and the second timer comprises:

restarting, by the controller, the first timer based on the first remaining time period, when an elapsed time period between the powering off of the UE and the powering on of the UE cannot be determined, and restarting the second timer based on the second remaining time period, when an elapsed time period between the powering off of the UE and the powering on of the UE cannot be determined.

4. The method of claim 1, wherein the first timer and the second timer are a timer "T3245".

5. The method of claim 1, wherein computer executable program instructions corresponding steps included in the method is stored in a non-transitory computer readable storage medium.

6. The method of claim 1, wherein the steps of the method are executed using executable program code stored in a storage module included in a system on chip (SoC).

7. An apparatus in a user equipment (UE) for controlling a first timer of a first subscriber identity mode (SIM) and a second timer of a second SIM, the apparatus comprising a controller configured to:

initiate the first timer after adding a first public land mobile network (PLMN) related to the first SIM to a forbidden PLMN list;

initiate the second timer after adding a second PLMN related to the second SIM to the forbidden PLMN list;

determine whether a current international mobile subscriber identity (IMSI) included in the second SIM matches a stored IMSI included in the first SIM in response to the UE being powered ON after being powered OFF;

if the current IMSI matches the stored IMSI, activate the first timer based on a first remaining time period of the first SIM and the second timer based on a second remaining time period of the second SIM;

keep the first PLMN in the forbidden PLMN list based on the first remaining time period, and keep the second PLMN in the forbidden PLMN list based on the second remaining time period;

remove the first PLMN from the forbidden PLMN list after the first remaining time period is expired, and remove the second PLMN from the forbidden PLMN list after the second remaining time period is expired; and stop the timer if the current IMSI does not match the stored IMSI.

8. The apparatus of claim 7, wherein the controller configured to:

determine whether the first remaining time period of the first SIM is greater than an elapsed time period between the powering off of the UE and the powering on of the UE and determine the second remaining time period of the second SIM is greater than the elapsed time period between the Dowering off of the UE and the powering on of the UE;

restart the first timer based on a difference between the first remaining time period of the first SIM and the elapsed time period, when the first remaining time period is greater than the elapsed time period, and restart the second timer based on a difference between the second remaining time period of the second SIM and the elapsed time period, when the second remaining time period is greater than the elapsed time period; and stop the first timer, when the remaining time period is less than or equal to the elapsed time period, and stop the second timer, when the second remaining time period is less than or equal to the elapsed time period.

9. The apparatus of claim 7, wherein the controller configured to:

restart the first timer based on the first remaining time period, when an elapsed time period between the powering off of the UE and the powering on of the UE cannot be determined, and restart the second timer based on the second remaining time period, when an elapsed time period between the powering off of the UE and the powering on of the UE cannot be determined.

10. The apparatus of claim 7, wherein the first timer and the second timer are a timer "T3245".

11. The apparatus of claim 7, wherein the controller is included in a system on chip (SoC).

* * * * *